(12) United States Patent
Nguyen et al.

(10) Patent No.: US 6,982,849 B2
(45) Date of Patent: Jan. 3, 2006

(54) METHOD AND APPARATUS FOR PROVIDING POSITIONAL INFORMATION ON A DISK

(75) Inventors: Tung Nguyen, San Jose, CA (US); Sang Hoon Chu, Santa Clara, CA (US); Jun Seok Shim, Cupertino, CA (US); Kang Seok Lee, Cupertino, CA (US); Soo Il Choi, Santa Clara, CA (US); Seong Hwan Yu, San Jose, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 315 days.

(21) Appl. No.: 09/952,684

(22) Filed: Sep. 13, 2001

(65) Prior Publication Data

US 2003/0048567 A1 Mar. 13, 2003

Related U.S. Application Data

(60) Provisional application No. 60/232,649, filed on Sep. 14, 2000.

(51) Int. Cl.
*G11B 5/596* (2006.01)

(52) U.S. Cl. .................................. 360/77.08
(58) Field of Classification Search ............ 360/50, 360/77.08, 51, 54, 77.06, 75, 48, 78.07
See application file for complete search history.

(56) References Cited

U.S. PATENT DOCUMENTS

| | | |
|---|---|---|
| 3,834,392 A | 9/1974 | Lampman et al. |
| 4,343,300 A | 8/1982 | Hattori |
| 4,499,895 A | 2/1985 | Takayama |
| 4,572,198 A | 2/1986 | Codrington |
| 4,573,452 A | 3/1986 | Greenberg |
| 4,601,705 A | 7/1986 | McCoy |
| 4,621,618 A | 11/1986 | Omagari |
| 4,633,304 A | 12/1986 | Nagasaki |
| 4,672,963 A | 6/1987 | Barken |
| 4,758,222 A | 7/1988 | McCoy |
| 4,785,806 A | 11/1988 | Deckelbaum |
| 4,788,975 A | 12/1988 | Shturman et al. |
| 4,790,813 A | 12/1988 | Kensey |
| 4,875,897 A | 10/1989 | Lee |
| 4,887,605 A | 12/1989 | Angelsen et al. |

(Continued)

FOREIGN PATENT DOCUMENTS

EP 0079524 A1 5/1983

*Primary Examiner*—David Hudspeth
*Assistant Examiner*—Fred F. Tzeng
(74) *Attorney, Agent, or Firm*—Ben J. Yorks; Jeffrey P. Aiello; Irell & Manella LLP

(57) ABSTRACT

The present invention is a method and apparatus for positioning a read/write head in a hard disk drive. The method comprises providing a disk having a at least one side with a plurality of tracks, where each of the tracks has a servo field with servo bits. The servo bits are read to provide a position signal for positioning a read/write head. The method determines a difference in position between an initial and a subsequent position of the read/write head on a track, where the subsequent location occurs after the read/write head has moved one revolution from the initial position on the track. The initial and subsequent positions are offset laterally. The method generates a compensation signal based on the initial position, the subsequent position and the difference. The position signal and the compensation signal are combined to provide a compensated position signal for positioning the read/write head. Various embodiments are described.

4 Claims, 11 Drawing Sheets

U.S. PATENT DOCUMENTS

| | | |
|---|---|---|
| 4,974,607 A | 12/1990 | Miwa |
| 4,996,975 A | 3/1991 | Nakamura |
| 5,078,714 A | 1/1992 | Katims |
| 5,104,392 A | 4/1992 | Kittrell et al. |
| 5,125,888 A | 6/1992 | Howard et al. |
| 5,170,299 A | 12/1992 | Moon |
| 5,203,781 A | 4/1993 | Bonati et al. |
| 5,217,001 A | 6/1993 | Nakao et al. |
| 5,217,003 A | 6/1993 | Wilk |
| 5,217,453 A | 6/1993 | Wilk |
| 5,228,429 A | 7/1993 | Hatano |
| 5,233,482 A | 8/1993 | Galbraith et al. |
| 5,259,365 A | 11/1993 | Nishikori et al. |
| 5,268,803 A | 12/1993 | Sugita et al. |
| 5,274,510 A | 12/1993 | Sugita et al. |
| 5,293,276 A * | 3/1994 | Dunn et al. .................... 360/51 |
| 5,301,080 A | 4/1994 | Ottesen et al. |
| 5,335,121 A | 8/1994 | Bombeeck |
| 5,335,123 A | 8/1994 | Shimizu et al. |
| 5,367,409 A | 11/1994 | Ottesen et al. |
| 5,368,015 A | 11/1994 | Wilk |
| 5,384,671 A | 1/1995 | Fisher |
| 5,388,127 A | 2/1995 | Scarpa |
| 5,402,280 A | 3/1995 | Supino |
| 5,483,393 A | 1/1996 | Mento et al. |
| 5,497,111 A | 3/1996 | Cunningham |
| 5,517,371 A * | 5/1996 | Takei ...................... 360/77.08 |
| 5,523,899 A | 6/1996 | Parken et al. |
| 5,539,714 A | 7/1996 | Andrews, Jr. et al. |
| 5,566,101 A | 10/1996 | Kodra |
| 5,581,420 A | 12/1996 | Chainer et al. |
| 5,590,154 A | 12/1996 | Forni et al. |
| 5,606,469 A | 2/1997 | Kosugi et al. |
| 5,608,587 A | 3/1997 | Smith |
| 5,615,058 A | 3/1997 | Chainer et al. |
| 5,617,264 A * | 4/1997 | Taguchi et al. ................ 360/54 |
| 5,781,133 A | 7/1998 | Tsang |
| 5,796,543 A * | 8/1998 | Ton-That ................. 360/77.08 |
| 5,822,143 A | 10/1998 | Cloke et al. |
| 5,844,920 A | 12/1998 | Zook et al. |
| 5,862,007 A | 1/1999 | Pham et al. |
| 5,898,532 A | 4/1999 | Du et al. |
| 5,961,658 A | 10/1999 | Reed et al. |
| 6,094,316 A | 7/2000 | Pham et al. |
| 6,157,510 A * | 12/2000 | Schreck et al. .......... 360/77.06 |
| 6,266,205 B1 * | 7/2001 | Schreck et al. .......... 360/77.06 |
| 6,519,107 B1 * | 2/2003 | Ehrlich et al. ................ 360/75 |
| 6,646,823 B1 * | 11/2003 | Brunnett ...................... 360/48 |
| 6,728,061 B2 * | 4/2004 | Takaishi ................. 360/78.07 |

\* cited by examiner

ORIGINAL PES

CORRECTION SIGNAL

ORIGINAL PES AND CORRECTION SIGNAL

METHOD AND APPARATUS FOR PROVIDING POSITIONAL INFORMATION ON A DISK

CROSS-REFERENCE TO RELATED APPLICATION

The present application is a non-provisional application of a provisional application, assigned Provisional Application Ser. No. 60/232,649, and filed Sep. 14, 2000.

BACKGROUND OF THE INVENTION

1. Field of the Invention

The present invention relates in general to disk storage systems and more particularly, methods and apparatus for providing positional information on a disk in a hard drive assembly.

2. Description of the Related Art

Disk drives are magnetic recording devices used for the storage of information. The information is typically recorded on concentric tracks on either surface of one or more magnetic recording disks. To facilitate the storage and retrieval of data in an orderly manner, disks are typically organized in blocks called sectors. These sectors are located on the disk by a set of unique specifiers called cylinder (or track), head (or side) and sector number. The disks are rotatably mounted to a spin motor and information is accessed by means of read/write heads that are mounted to actuator arms which are rotated by a voice coil motor. The voice coil motor is excited with a current to rotate the actuator and move the heads. The read/write heads must be accurately aligned with the storage tracks on the disk to ensure proper reading and writing of information.

To accurately write and read data, it is desirable to maintain the head on the center of the track. To assist in controlling the position of the head, each sector of the disk typically contains a number of servo bits accurately located relative to the centerline of the track. The raw signals produced by the servo bits are typically demodulated into a position signal which is utilized by a servo system to determine the position of the head relative to the track, and to move the actuator arm if the head is not located on the track centerline.

Due to defects in the servo patterns, the read head does not return to its original position after one revolution, as shown in FIG. 1A. This results in a gap between the original (starting) position and the position of the read/write head after one revolution. The resulting position signal is an anomaly, and takes the form of a spike, as shown in FIG. 1B.

Accordingly, there is a need in the technology for a method and apparatus for providing servo information on a disk in a hard drive assembly while overcoming the aforementioned problems.

BRIEF SUMMARY OF THE INVENTION

The present invention is a method and apparatus for positioning a read/write head in a hard disk drive. The method comprises providing a disk having a at least one side with a plurality of tracks, where each of the tracks has a servo field with servo bits. The servo bits are read to provide a position signal for positioning a read/write head. The method determines a difference in position between an initial and a subsequent position of the read/write head on a track, where the subsequent location occurs after the read/write head has moved one revolution from the initial position on the track. The initial and subsequent positions are offset laterally. The method generates a compensation signal based on the initial position, the subsequent position and the difference. The position signal and the compensation signal are combined to provide a compensated position signal for positioning the read/write head. Various embodiments are described.

DETAILED DESCRIPTION OF THE INVENTION

The present invention maybe used in conjunction with a defect management system, as described in U.S. patent application Ser. No. 09/952,683, entitled "Servo Defect Management Scheme in Hard Disk Drives" filed on Sep. 13, 2001, which has been assigned to the assignee hereof, and which is hereby fully incorporated by reference.

Figure 1A:
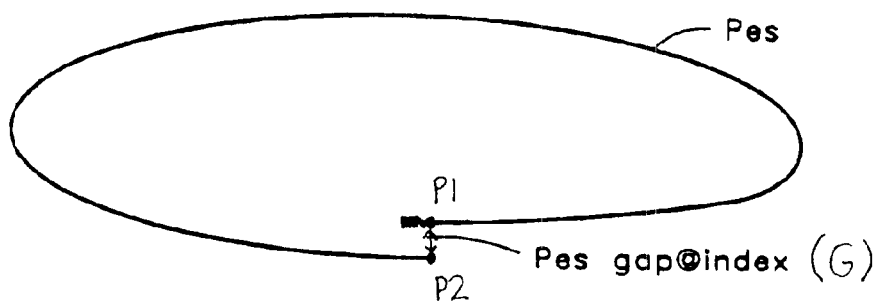
FIG. 1A illustrates the starting position of a typical read head and the subsequent position of the read head after one revolution.
Figure 1B:
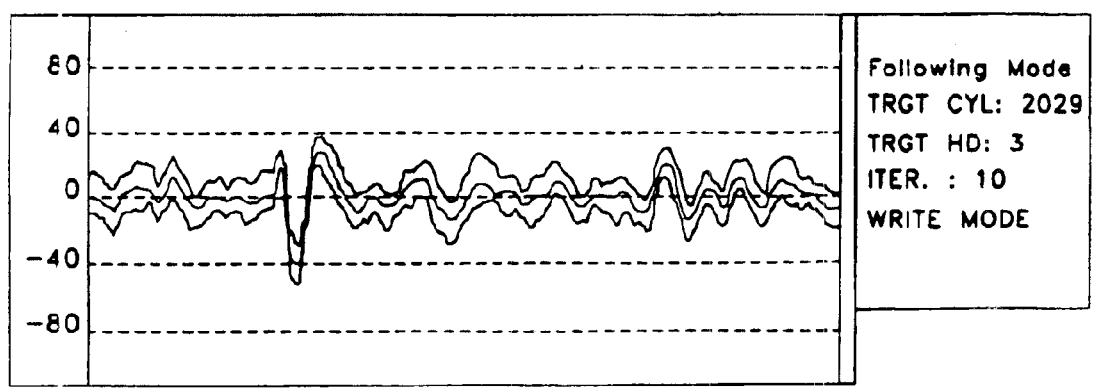
FIG. 1B illustrates a spiked signal resulting from the error as shown in FIG. 1A.

As discussed earlier, due to defects in the servo patterns, the read head does not return to its original position after one revolution, as shown in FIG. 1A. This results in a gap G between the original (starting) position P1 and the position P2 of the read/write head after one revolution. The resulting position signal is an anomaly, and takes the form of a spike, as shown in FIG. 1B. The present invention provides and apparatus and methods for eliminating the anomalous signal, by providing a correction term to the position signal used to direct the read head.

Figure 2A:
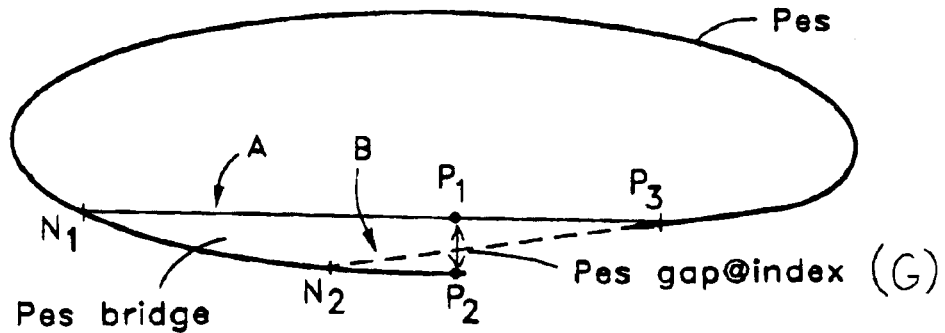
FIG. 2A illustrates two embodiments of a process for providing correction of non-centered position signal, in accordance with the principles of the invention.

FIG. 2A illustrates two embodiments of a process for providing correction of non-centered position signal, in accordance with the principles of the invention. In one embodiment as illustrated by the line A in FIG. 2A, the corrected position signal PES directs the read head at a position N1 sectors before the gap G, to move substantially linearly to the original position P1. In an alternate embodiment, as illustrated by the line B in FIG. 2A, the corrected position signal PES directs the read head from a position N2 sectors before the gap G, passes through the mid point of the gap G, to move substantially linearly to a position P3 that is located after the original position P1. In one embodiment, N2 is N1/2, and P3 is located at a position N2 after the gap G.

Figure 2B:
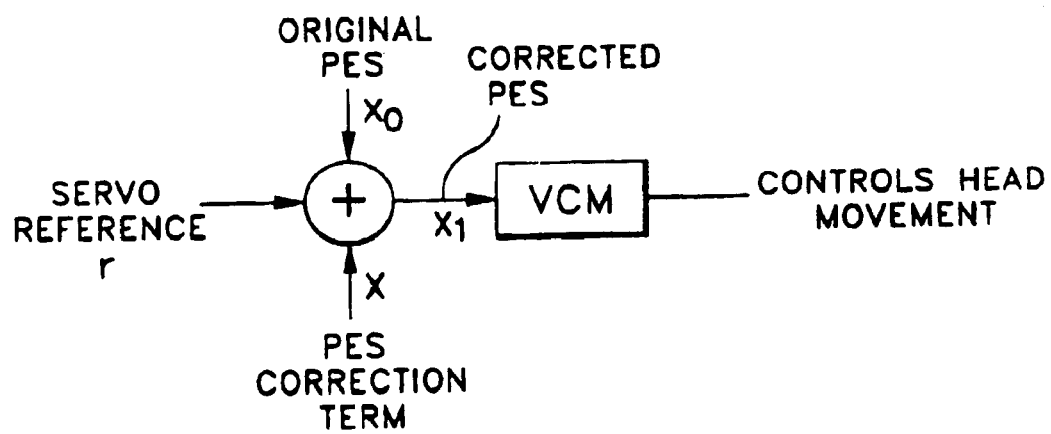
FIG. 2B illustrates one embodiment of a process for providing a corrected position signal.
Figure 2C:
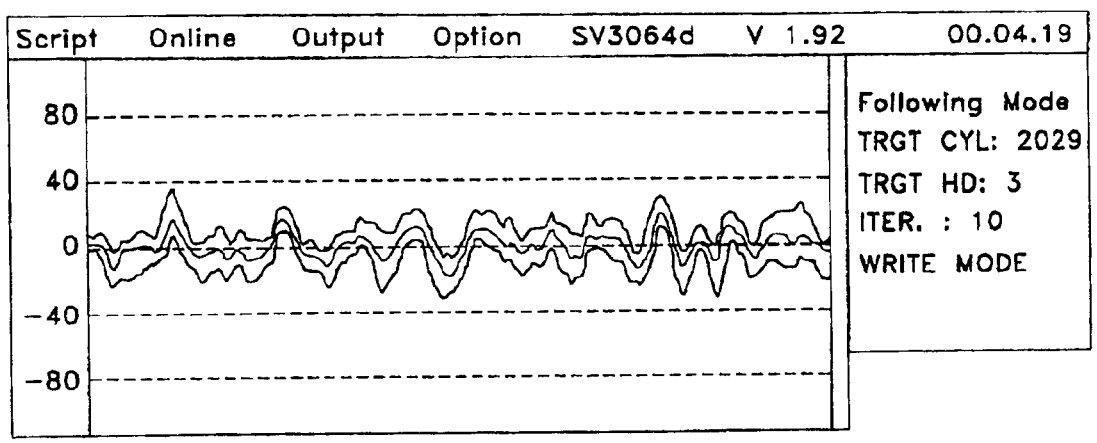
FIG. 2C illustrates the result of applying the position signal correction process to the error in FIG. 1B.

FIG. 2B illustrates one embodiment of a process for providing a corrected PES signal. The servo reference signal r is typically combined with an original PES signal $X_0$ and the resulting signal is provided to the voice coil motor VCM, which controls movement of the read head. In accordance with the principles of the invention, a signal X, representing the value of the PES correction term, is added to the servo reference signal r and the original PES signal $X_0$, and the resulting signal, $X_1$ is provided to the VCM. By adding X to the servo reference signal and the original PES signal $X_0$, the VCM will control the read head to travel along one of the two paths described in FIG. 2A and the corresponding text.

Figure 3:
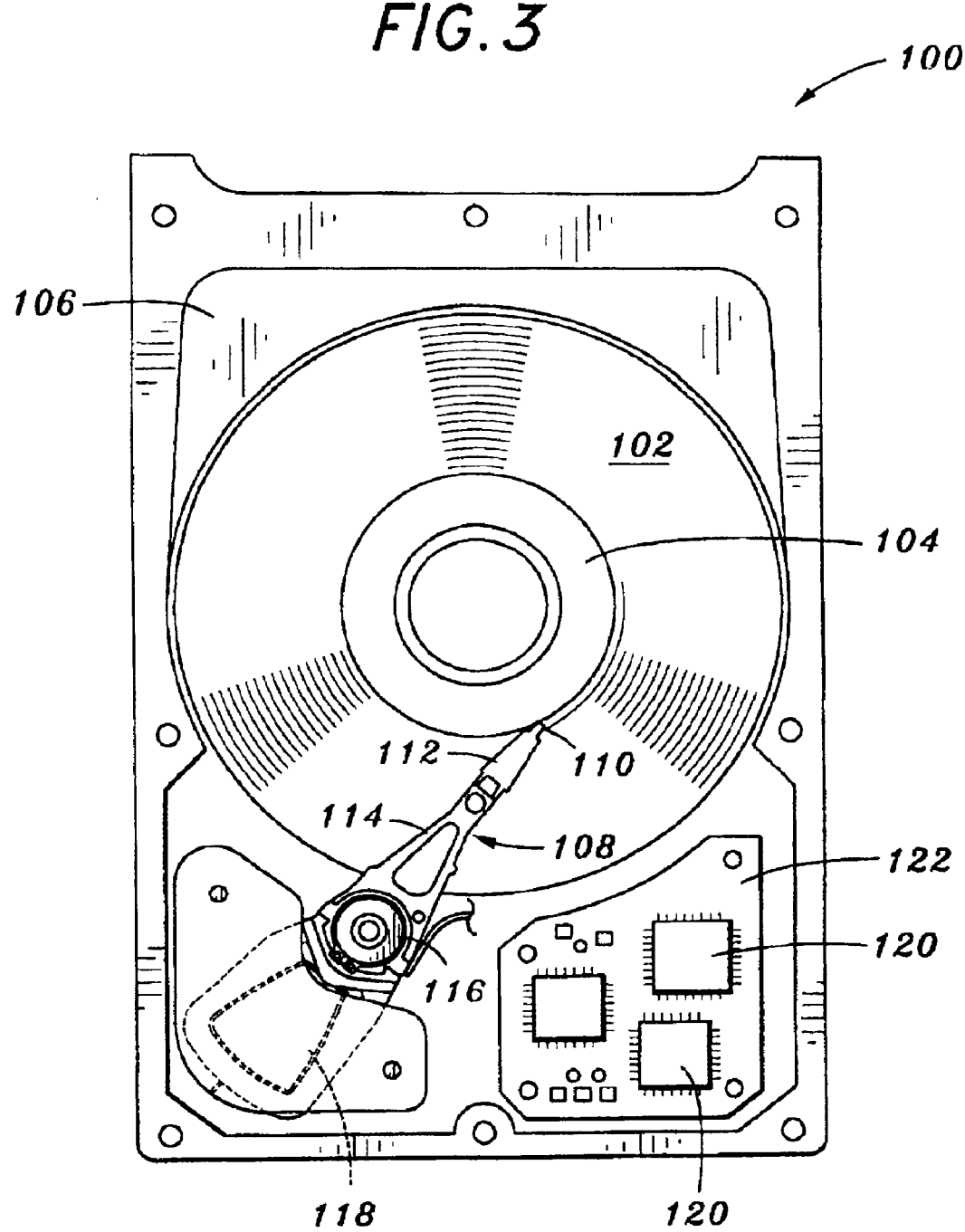
FIG. 3 illustrates a hard disk drive which utilizes the methods of the invention.

Referring to the drawings more particularly by reference numbers, FIG. 3 shows a hard disk drive 100. The disk drive 100 includes a disk 102 that is rotated by a spin motor 104. The spin motor 104 is mounted to a base plate 106. Also mounted to the base plate 106 is an actuator arm assembly 108. The actuator arm assembly 108 includes a number of heads 110 mounted to corresponding flexure arms 112. The flexure arms 112 are attached to an actuator arm 114 that can rotate about a bearing assembly 116. The assembly 108 also contains a voice coil 118 that is coupled to the magnets 119 that are mounted to the base plate 106. Energizing the voice coil 118 moves the heads 110 relative to the disk 102. There is typically a single head for each disk surface. The spin motor 104, voice coil 118 and the heads 110 are coupled to a number of electronic circuits 120 mounted to a printed circuit board 122. In the following discussion, only one head 110 is referenced. The electronic circuits 120 typically include a read channel circuit, a microprocessor-based controller and a random access memory (RAM) device.

Figure 4:
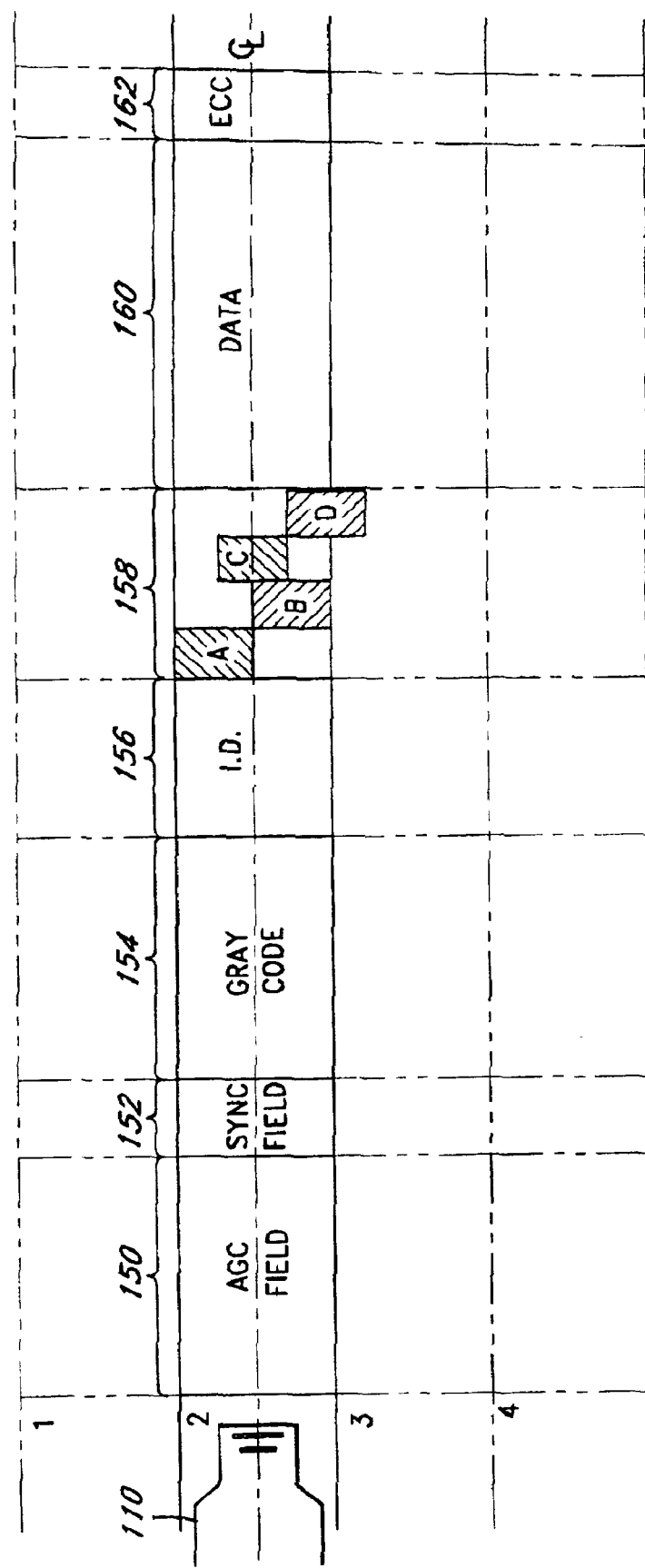
FIG. 4 illustrates the general layout of the servo field region of a track.

As shown in FIG. 4, data is typically stored within sectors of radially concentric tracks located across the disk 102. A typical sector will have an automatic gain control (AGC) field 150, a synchronization (sync) field 152, a gray code field 154 that identifies the track, an identification (ID) field 156 that defines the sector, a servo field 158 which includes a number of servo bits A, B, C, D, a data field 160 which contains the data and an error correction code field 162. In operation, the head 110 is moved to a track and the servo information provided in servo field 158 is read and provided to the electronic circuits 120. The electronic circuits 120 utilize the variation in the servo bits (A–B) or (C–D) to generate Q, a positioning signal for aligning the head 110.

Figure 5:
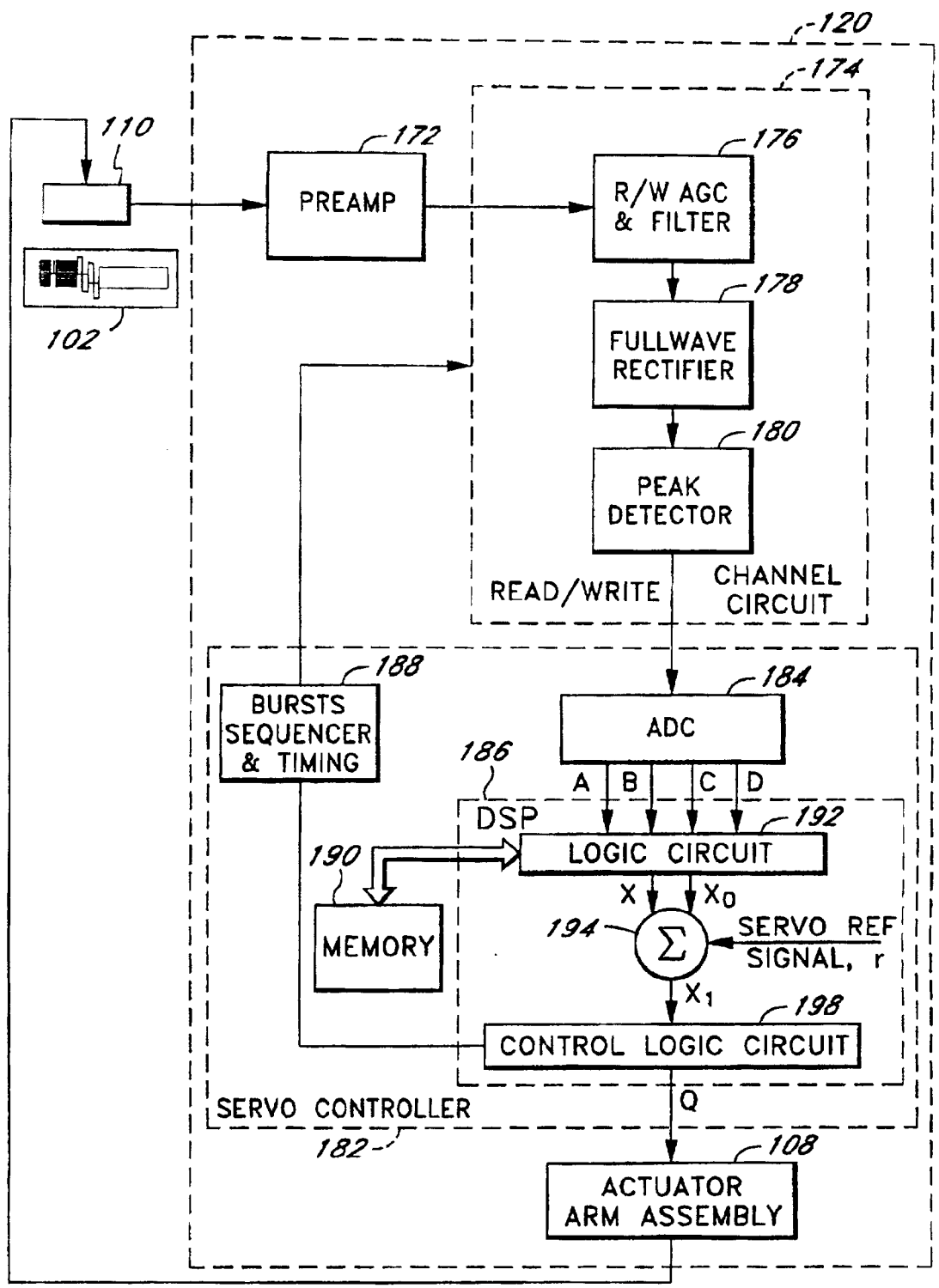
FIG. 5 is a block diagram of portions of an integrated circuit read channel in accordance with the present invention.

FIG. 5 is a block diagram of an electronic circuit 120 of the drive. The electronic circuit 120 includes a preamplifier 172 which is coupled to a read/write (R/W) channel circuit 174. The R/W channel circuit 174 includes a R/W Automatic Gain Control (AGC), a filter circuit 176, a fullwave rectifier 178 and a peak detector 180. The electronic circuit 120 further comprises a microprocessor-based servo controller 182 which includes an analog-to-digital converter (ADC) 184, a digital signal processor (DSP) 186, a burst sequencer and timing circuit 188 and a memory 190, such as a random access memory (RAM) device. The DSP 186 includes a logic circuit 192, a summing circuit 194 and a control logic circuit 198.

The electronic circuit 120 is coupled to one of the magnetic heads 110 which senses the magnetic field of a magnetic disk 102. When reading the servo information located in the servo field region 10 on the disk 102, the head 110 generates a read signal that corresponds to the magnetic field of the disk 102. The read signal is first amplified by the preamplifier 172, and then provided to the R/W channel circuit 174. The AGC data included in the read signal is provided to the R/W AGC and filter circuit 176. The R/W AGC circuit in circuit 176 monitors the AGC data provided by the read signal and the read signal is then filtered by the filter circuit located in the R/W AGC and filter circuit 176. The fullwave rectifier 178 rectifies the read signal and provides the rectified read signal to the peak detector 180. The peak detector 180 detects the amplitude of the read signal. The read signal is then provided to the ADC 184 which provides digitized samples of the analog read signal. The digitized signal is then provided to a logic circuit 192 located within the DSP 186. The logic circuit 192 generates a position signal $X_O$, based on the servo bits A, B, C and D that are read by the head 110. The position signal $X_O$ is provided to the summing circuit 194. The logic circuit 192 also generates a PES correction signal X, based on the servo bits A, B, C, and D.

The PES correction signal X is added to the position signal XO. A servo reference signal X is also added to XO. Based on the sum of r, XO and X, a corrected PES signal, X, is generated and provided to the control logic circuit 198. The control logic circuit 198 calculates a compensated signal as control signal Q. The resulting control signal Q is stored in memory 190. The control signal Q is subsequently provided to the actuator arm assembly 108 to move the heads 110. Alternatively, the control signal Q can be provided directly to the actuator arm assembly 108 to move the heads 110.

Figure 6A:
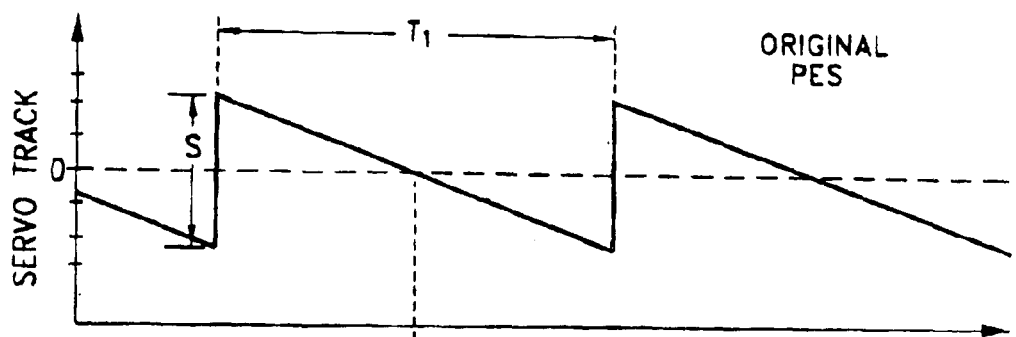
FIG. 6A illustrates one embodiment of a typical position signal PES used to center a read head along the centerline of a track.
Figure 6B:
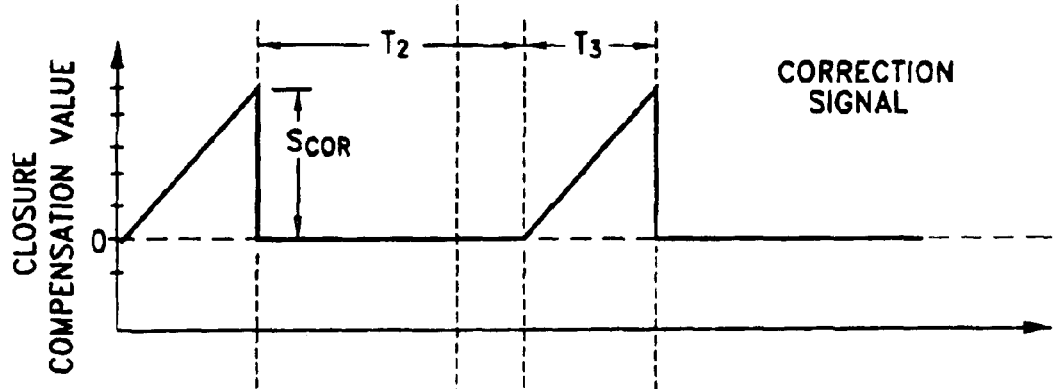
FIG. 6B illustrates one embodiment of a correction signal $PES_{COR}$ used to correct the position signal PES in providing a centered position signal.
Figure 6C:
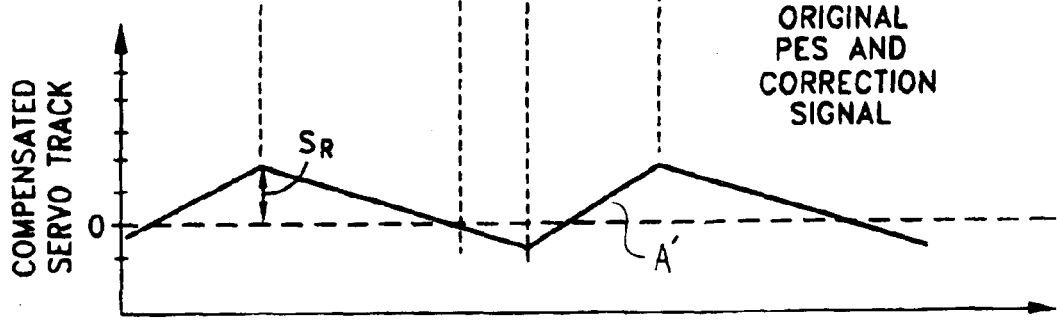
FIG. 6C illustrates one embodiment of the resulting signal obtained when the position signal PES is combined with the correction signal $PES_{COR}$.

FIG. 6A illustrates one embodiment of a typical position signal PES used to center a read head along the centerline of a track. As discussed earlier, the read head typically does not return to its original position after one revolution, as shown in FIG. 1A. As a result, a correction signal is added to the original position signal PES to correct this anomaly. FIG. 6A illustrates one embodiment of a PES signal modeled as a sawtooth waveform. As shown, the period T1 of the waveform corresponds to the time it takes for the disk to complete one revolution. The magnitude of the waveform corresponds to an off-track position of +/−5%. FIG. 6B illustrates one embodiment of a correction signal PESCOR used to correct the position signal PES in providing a centered position signal. The PES gap C in FIG. 2A corresponds to the peak-to-peak value S of the waveform. By implementing the techniques of the invention, the corrected PES signal will result in the form as shown by line A' corresponding to the paths A as shown in FIG. 2A. In one embodiment, the magnitude SCOR of the correction signal PESCOR is the same as the magnitude S of the original position signal PES. However, the period T1 of the signal S is equal to the period T3 of the correction signal PESCOR and T2 the interval between each correction signal. FIG. 6C illustrates one embodiment of the resulting position signal obtained using the correction signal of FIG. 6B. In one embodiment, the magnitude SR of the resulting correction signal is equal to S/2 if the original position signal S is symmetric.

Figure 7A:
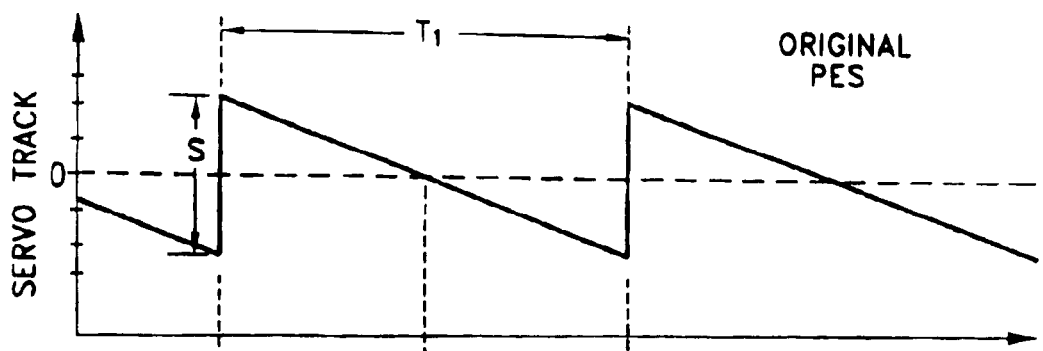
FIG. 7A illustrates one embodiment of a typical position signal PES used to center a read head along the centerline of a track.
Figure 7B:
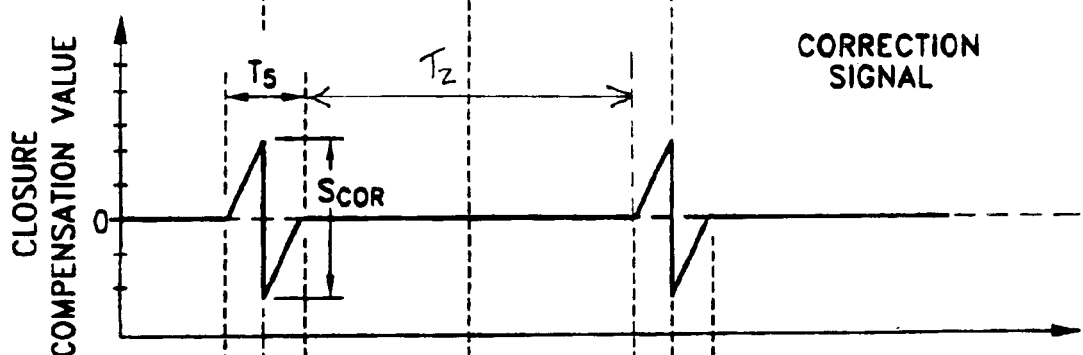
FIG. 7B illustrates a second embodiment of a correction signal $PES_{COR}$ used to correct the position signal PES in providing a centered position signal.
Figure 7C:
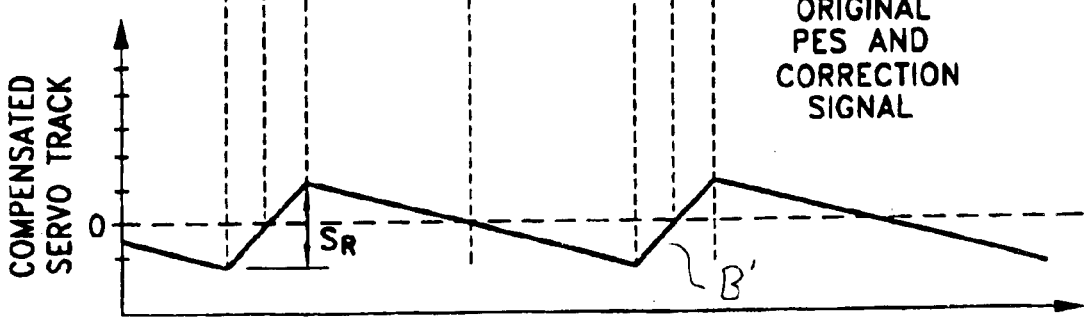
FIG. 7C illustrates one embodiment of the resulting signal obtained when the position signal PES is combined with the correction signal $PES_{COR}$.

FIG. 7A illustrates a second embodiment of an uncorrected position signal used in providing a centered position signal. FIG. 7A illustrates one embodiment of a PES signal modeled as a sawtooth waveform. As shown, the period T1 of the waveform corresponds to the time it takes for the disk to complete one revolution. The magnitude of the waveform corresponds to an off-track position of +/−5%. FIG. 7B illustrates one embodiment of a correction signal PESCOR used to correct the position signal PES in providing a centered position signal. In this embodiment, the correction signal is a dipulse signal having a period of T5, where T5<T1. The PES gap G in FIG. 2A corresponds to the peak-to-peak value S of the waveform. By implementing the techniques of the invention, the corrected PES signal will result in the form as shown by line B' corresponding to the paths B as shown in FIG. 2A. In one embodiment, the magnitude SCOR of the correction signal PESCOR is the same as the magnitude S of the original position signal PES. However, the period T1 of the signal S is equal to the period T5 of the correction signal PESCOR and T2 the interval between each correction signal. FIG. 7C illustrates one embodiment of the resulting position signal obtained using the correction signal of FIG. 7B. In one embodiment, the magnitude SR of the resulting correction signal is the same as that of the original PES signal.

Figure 8:
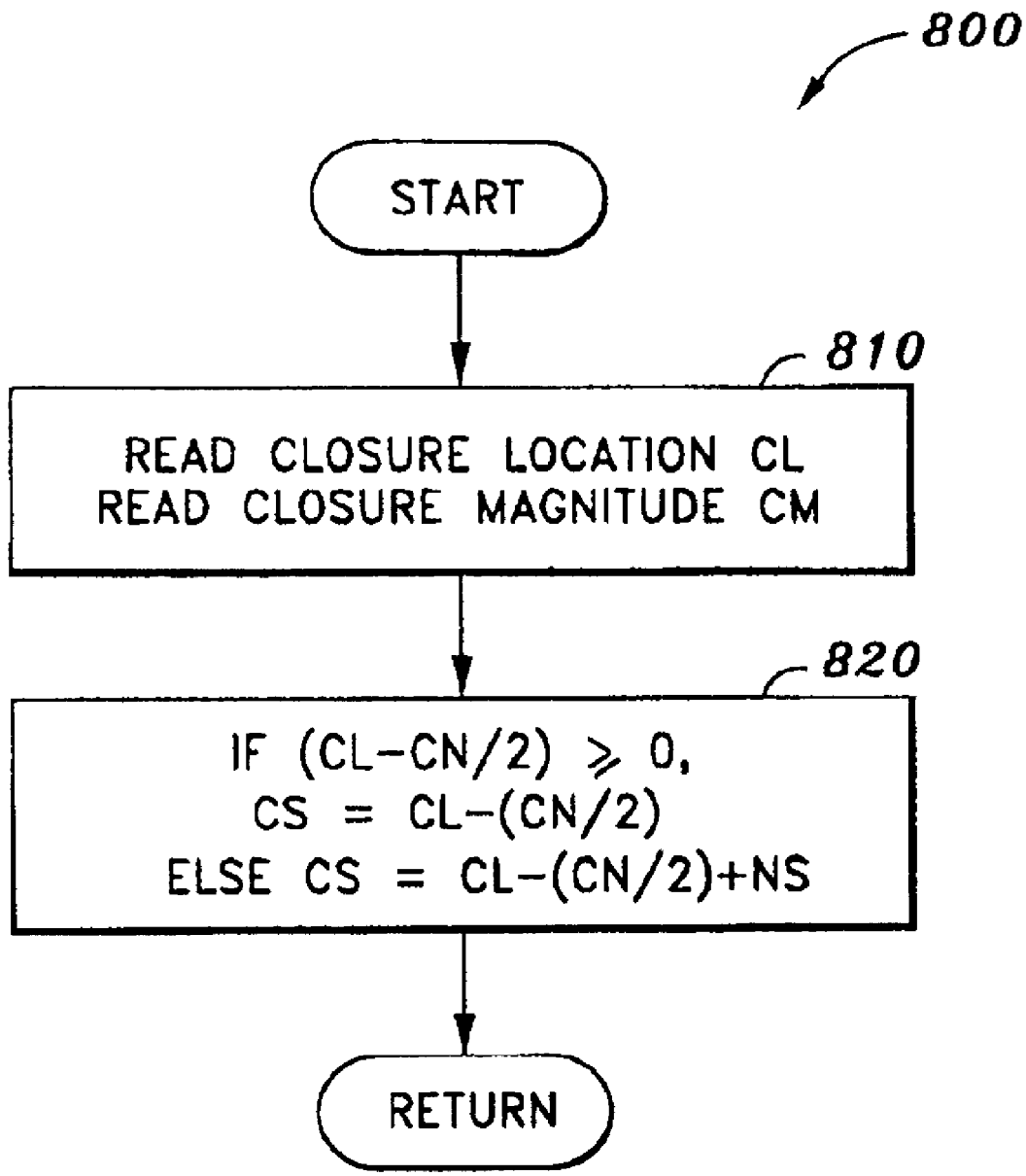
FIG. 8 is a flow chart illustrating one embodiment of an initialization process that may be implemented prior to the position signal correction process.

FIG. 8 is a flow chart illustrating one embodiment of the initialization process used prior to the position signal correction process of the invention. The process of the invention utilizes variables stored in a file. Before arriving at a target cylinder, various variables are initialized. The process proceeds as follows. Beginning from a START state, the process 800 proceeds to process block 810, where the gap closure location CL and the gap closure magnitude CM are read back from a closure defect list or file. The process 800 then determines CS, the sector number at which the closure compensation process is to begin, as shown in process block 820 in the following manner:

If $(CL-CN/2) \geq 0$, then $CS=(CN/2)$

Otherwise $CS=CL-(CN/2)+NS$

Where:
CL is the gap closure location (measured by sector number);
CN is the gap compensation value (measured by sector number);
NS is the number of sectors per revolution on the disk.

Thus, if the gap closure location is more than half of the gap compensation value, then CS is initialized as half of the gap compensation value. Otherwise, it is initialized as the difference between the sum of the gap closure location and the number of sectors per revolution, and half the gap compensation value. The process 800 then returns to the main process flow.

Figure 9A:
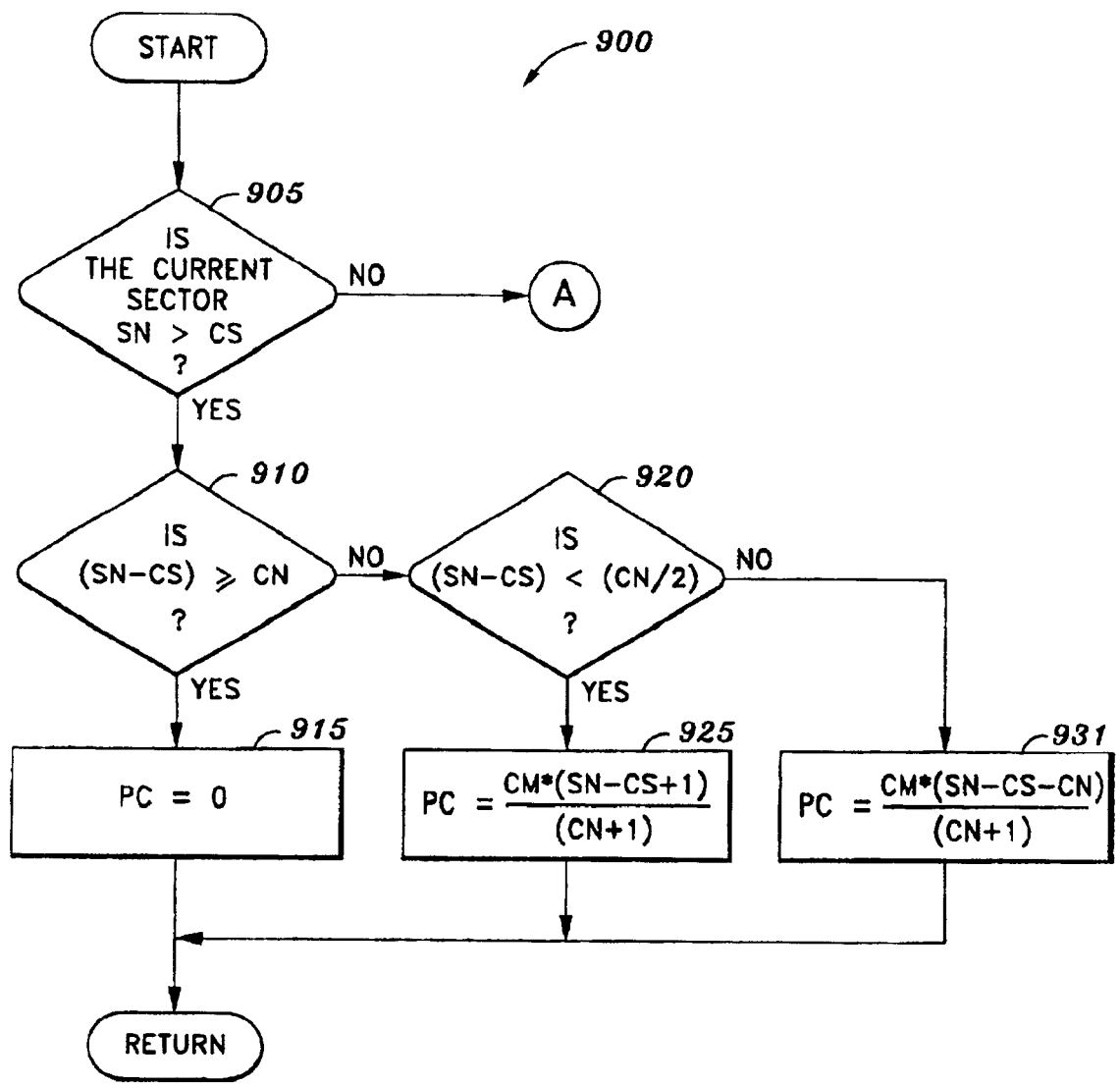
FIGS. 9A and 9B are flow charts illustrating one embodiment of the position signal correction process provided in accordance with the principles of the invention.
Figure 9B:
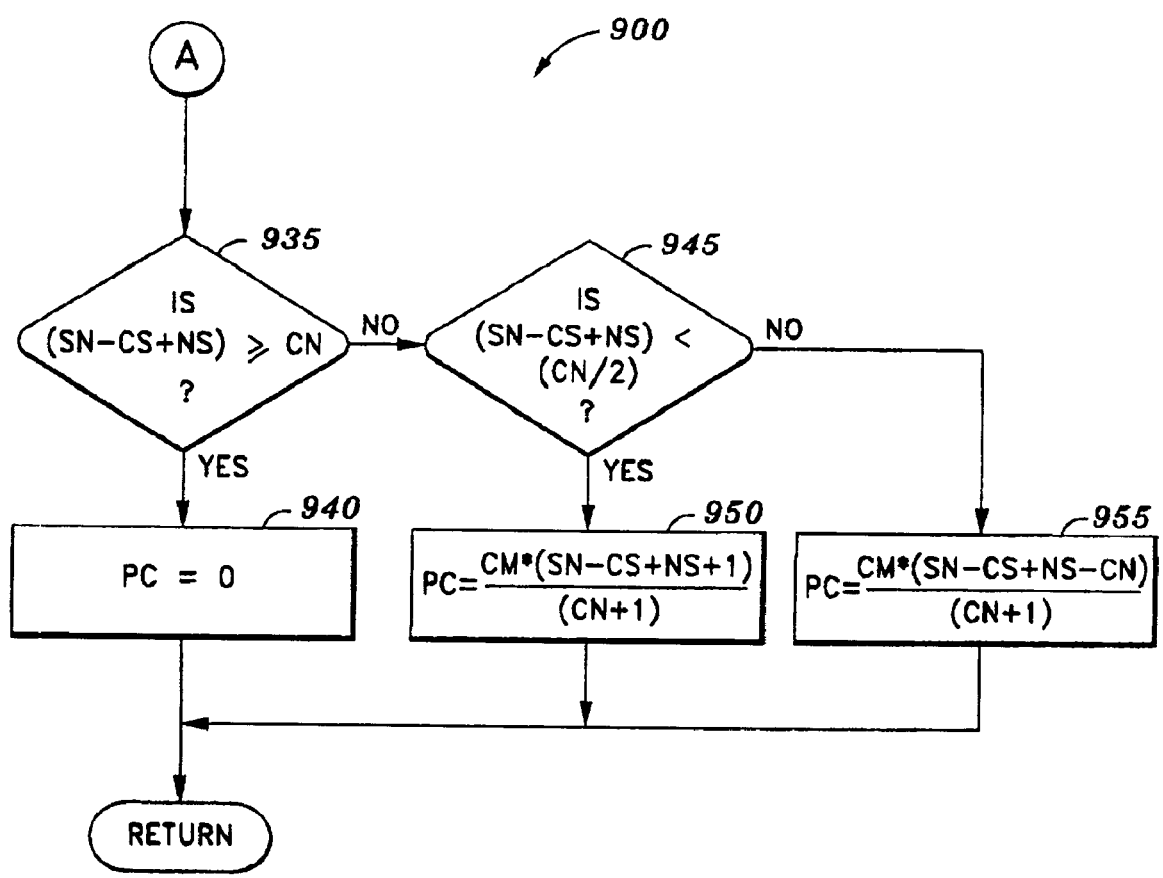

FIGS. 9A and 9B are flow charts illustrating one embodiment of the position signal correction process provided in accordance with the principles of the invention. The process 900 determines PC, the PES correction value to use based on various criteria as described below. The process 900 proceeds from a START state to decision block 905, where it queries if the current sector SN is greater than CS, the sector number at which the closure compensation process is to begin. CS had previously been determined as shown in FIG. 8 and the corresponding text. If SN is greater than CS, the process 900 proceeds to process block 910, where it determines if the difference between SN and CS is greater or equal to CN, the length of the gap compensation (in sectors). If so, PC, the PES compensation value is set to zero (process block 915). The process 900 then returns to the main process flow. During the main process flow, the original position signal is combined with the PES compensation value to provide the resulting compensated PES value. The compensated PES value is then used to position the read/write head.

If at decision block 910, (SN−CS) is determined to be less than CN, the process 900 proceeds to process block 920, where it queries if (SN−CS) is less than (CN/2). If so, the process 900 proceeds to process block 925, where PC is determined as follows:

$$PC=CM*(SN-CS+1)/(CN+1)$$

where CM is the magnitude of the gap. The process 900 then proceeds to return to the main process flow.

If, at decision block 920, the process 900 determines that (SN−CS) is not less than (CN/2), the process proceeds to process block 931, where PC is determined as follows:

$$PC=CM*(SN-CS-CN)/(CN+1)$$

The process 900 then returns to the main process flow.

If, at decision block 905, the process determines that the current sector SN is not greater than CS, the process proceeds to decision block 935, where it determines if (SN−CS+NS) is greater than or equal to CN. If so, the process 900 proceeds to process block 940, where PC is set to zero. The process 900 then returns to the main process flow.

Otherwise, the process 900 proceeds to decision block 945 where it determines if (SN−CS+NS) is less than (CN/2). If so, PC is determined as follows (process block 950):

$PC=CM*(SN-CS+NS+1)/(CN+1)$. The process 900 then returns to the main process flow.

Otherwise, the process 900 determines PC as follows (process block 955):

$$PC=CM*(SN-CS+NS-CN)/(CN+1).$$

The process 900 then returns to the main process flow.

What is claimed is:

1. A method for positioning a read/write head in a hard disk drive, comprising:
    a) providing a disk having at least one side with a plurality of tracks, each of said tracks having a servo field, said servo field having servo bits;
    b) reading said servo bits to provide a position signal for positioning a read/write head;
    c) determining a magnitude of a difference in position between an initial and a subsequent position of the read/write head on a track, said subsequent location to occur after said read/write head has moved one revolution from said initial position on said track, said initial and subsequent position being offset laterally; and
    d) generating a compensation signal based on said initial position, said subsequent position and said difference;
    e) combining said position signal and said compensation signal to provide a compensated position signal for positioning said read/write head.

2. The method as recited in claim 1, wherein c) further comprises: determining a sector for initiating gap compensation based on said initial and subsequent positions.

3. The method as recited in claim 2, wherein c) further comprises determining if a difference between said initial position and half of a length of said gap compensation is greater or equal to zero; if so, said sector for initiating gap compensation is equal to a difference between said initial position and half of a length of said gap compensation; otherwise, said sector for initiating gap compensation is equal to a sum of said difference between said initial position and half of a length of said gap compensation, and a total number of sectors on said track.

4. The method am recited in claim 3, wherein in d) said compensation signal is further based on a current position of said read/write head and said length of said gap compensation.

* * * * *